US007019943B2

(12) United States Patent
Sato

(10) Patent No.: US 7,019,943 B2
(45) Date of Patent: Mar. 28, 2006

(54) THIN-FILM MAGNETIC HEAD WITH IMPROVED EXTERNAL MAGNETIC FIELD-BLOCKING CHARACTERISTICS

(75) Inventor: Yoshikazu Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 91 days.

(21) Appl. No.: 10/421,885

(22) Filed: Apr. 24, 2003

(65) Prior Publication Data

US 2003/0231426 A1 Dec. 18, 2003

(30) Foreign Application Priority Data

Jun. 12, 2002 (JP) ............................. 2002-171475

(51) Int. Cl.
*G11B 5/147* (2006.01)

(52) U.S. Cl. ....................................... 360/126; 360/319

(58) Field of Classification Search ................ 360/126
See application file for complete search history.

(56) References Cited

U.S. PATENT DOCUMENTS 4,656,546 A * 4/1987 Mallory ...................... 360/110
5,075,956 A * 12/1991 Das ......................... 29/603.14
6,762,910 B1 * 7/2004 Knapp et al. ............... 360/126
6,785,097 B1 * 8/2004 Okada et al. ............... 360/317

FOREIGN PATENT DOCUMENTS

JP 04-109415 4/1992

OTHER PUBLICATIONS

Matsuzaki, "Magnetic Head Now and Future", Information Technology Research Center, pp. 9-15, 2002 w/ English Trans.

* cited by examiner

*Primary Examiner*—A. J. Heinz
(74) *Attorney, Agent, or Firm*—Oliff & Berridge, PLC

(57) ABSTRACT

A thin-film magnetic head comprises an inductive type electromagnetic transducer having a first magnetic pole, a second magnetic pole, and a thin-film coil. A recording shield layer made of a magnetic material is formed on the side of the second magnetic pole opposite from the first magnetic pole. A recording shield gap layer made of a nonmagnetic material is formed between the second magnetic pole and the recording shield layer. By way of the recording shield gap layer, the recording shield layer covers at least both lateral parts of the second magnetic pole on the side of the second magnetic pole facing a recording medium.

6 Claims, 11 Drawing Sheets

THIN-FILM MAGNETIC HEAD WITH IMPROVED EXTERNAL MAGNETIC FIELD-BLOCKING CHARACTERISTICS

BACKGROUND OF THE INVENTION

1. Field of the Invention

The present invention relates to a thin-film magnetic head equipped with an inductive type electromagnetic transducer, a head slider, a head gimbal assembly, a hard disk drive, and a method of making a thin-film magnetic head.

2. Related Background Art

As hard disk drive have been increasing their areal density, magnetic heads for perpendicular recording have been coming into reality. The perpendicular recording becomes more stable as bits are recorded at a higher density, and thus is superior to longitudinal (in-plane) recording in resistance to thermal fluctuation. In such a perpendicular recording scheme, it has been feared that information recorded in a recording medium may be erased by external magnetic fields. When information is recorded in a double layer recording medium including a soft magnetic foundation layer by using a so-called single-pole head, for example, external magnetic fluxes may concentrate directly under the magnetic pole, thereby erasing the information recorded in the recording medium.

For overcoming such a problem of erasing the recording, a thin-film magnetic head comprising a shield layer made of a soft magnetic material near a single magnetic pole has conventionally been proposed (The Magnetics Society of Japan, the 124th Topical Symposium Data pp. 9–15). FIG. 11 schematically shows an example of such a thin-film magnetic head. This thin-film magnetic head 100 comprises a reproducing head section 110 and a recording head section 130.

The reproducing head section 110 mainly comprises a lower shield layer 112 made of a soft magnetic material, an MR (Magneto Resistive) device 114 for reading out information, and an upper shield layer 116. On the other hand, the recording head section 130, which is a so-called inductive type electromagnetic transducer, mainly comprises an auxiliary magnetic pole layer 132, a gap layer 133 made of a nonmagnetic material, a main magnetic pole 134, a recording shield gap layer 135 made of a nonmagnetic material, and a recording shield layer 136 made of a soft magnetic material. The recording shield layer 136 can block external magnetic fields. The recording shield gap layer 135 is provided in order to separate the main magnetic pole 134 and the recording shield layer 136 from each other. After the upper face of the recording shield gap layer 135 is flattened by chemical mechanical polishing or the like, the recording shield layer 136 is formed.

SUMMARY OF THE INVENTION

The recording shield layer improves external magnetic field blocking characteristics to some extent. However, the magnetic pole width has further been narrowing in order to follow the rapid improvement in areal density in recent years, thus concentrating magnetic fluxes and enhancing external magnetic fields, which makes it necessary for the external magnetic field blocking effect to improve further. Not only the magnetic heads for perpendicular recording, but also those for longitudinal recording are still required to improve their external magnetic field blocking characteristics as such.

It is an object of the present invention to provide a thin-film magnetic head excellent in the external magnetic field blocking effect, ahead slider, ahead gimbal assembly, a hard disk drive, and a method of making a thin-film magnetic head.

The present invention provides a thin-film magnetic head having an electromagnetic transducer comprising a first magnetic pole; a second magnetic pole, magnetically connected to the first magnetic pole at a position separated from a surface facing a recording medium, holding a gap layer made of a nonmagnetic material between the first and second magnetic poles; a coil at least partly located between the first and second magnetic poles; a recording shield layer made of a magnetic material and positioned on the side of the second magnetic pole opposite from the first magnetic pole; and a recording shield gap layer made of a nonmagnetic material and positioned between the second magnetic pole and the recording shield layer; the recording shield layer covering, by way of the recording shield gap layer, at least both lateral parts of the second magnetic pole on the side of the second magnetic pole facing the recording medium.

In the thin-film magnetic head of the present invention, the recording shield layer covers not only the recording medium flow-out side of the second magnetic pole, but also both lateral parts thereof. This can block external magnetic fields coming from the track width direction of the recording medium.

Preferably, in the thin-film magnetic head of the present invention, the recording shield layer has a substantially constant distance to the second magnetic pole in a depth direction from the surface facing the recording medium.

Such a configuration can restrain magnetic fluxes of the second magnetic pole from leaking toward the recording shield layer at the time of recording to the recording medium.

Preferably, in the thin-film magnetic head of the present invention, the second magnetic pole has a stepped part with a changed height, whereas the recording shield layer has a step at a position corresponding to the stepped part in the second magnetic pole.

Such a configuration can reduce the difference in distance between the second magnetic pole and the recording shield layer on the front and rear sides of the second magnetic pole as seen from the surface facing the recording medium. This can restrain magnetic fluxes of the second magnetic pole from leaking toward the recording shield layer at the time of recording to the recording medium.

Preferably, in the thin-film magnetic head of the present invention, at least the part facing the recording medium in the recording shield gap layer is formed from a nonmagnetic inorganic material. Such a configuration can improve the chemical resistance, mechanical breaking strength, and heat resistance of the recording shield gap layer in the manufacturing process and at the time when the recording shield gap layer comes into contact with the recording medium as compared with the case formed from organic materials.

The present invention provides a head slider comprising a thin-film magnetic head having an inductive type electromagnetic transducer, the inductive type electromagnetic transducer comprising a first magnetic pole; a second magnetic pole, magnetically connected to the first magnetic pole at a position separated from a surface facing a recording medium, holding a gap layer made of a nonmagnetic material between the first and second magnetic poles; a coil at least partly located between the first and second magnetic poles; a recording shield layer made of a magnetic material and positioned on the side of the second magnetic pole opposite from the first magnetic pole; and a recording shield gap layer made of a nonmagnetic material and positioned between the second magnetic pole and the recording shield layer; the recording shield layer covering, by way of the recording shield gap layer, at least both lateral parts of the second magnetic pole on the side of the second magnetic pole facing the recording medium.

In the head slider of the present invention, the recording shield layer covers not only the recording medium flow-out side of the second magnetic pole, but also both lateral parts thereof. This can block external magnetic fields coming from the track width direction of the recording medium.

The present invention provides a head gimbal assembly comprising a thin-film magnetic head having an inductive type electromagnetic transducer, the inductive type electromagnetic transducer comprising a first magnetic pole; a second magnetic pole, magnetically connected to the first magnetic pole at a position separated from a surface facing a recording medium, holding a gap layer made of a nonmagnetic material between the first and second magnetic poles; a coil at least partly located between the first and second magnetic poles; a recording shield layer made of a magnetic material and positioned on the side of the second magnetic pole opposite from the first magnetic pole; and a recording shield gap layer made of a nonmagnetic material and positioned between the second magnetic pole and the recording shield layer; the recording shield layer covering, by way of the recording shield gap layer, at least both lateral parts of the second magnetic pole on the side of the second magnetic pole facing the recording medium.

In the head gimbal assembly of the present invention, the recording shield layer covers not only the recording medium flow-out side of the second magnetic pole, but also both lateral parts thereof. This can block external magnetic fields coming from the track width direction of the recording medium.

The present invention provides a hard disk drive comprising a thin-film magnetic head having an inductive type electromagnetic transducer, the inductive type electromagnetic transducer comprising a first magnetic pole; a second magnetic pole, magnetically connected to the first magnetic pole at a position separated from a surface facing a recording medium, holding a gap layer made of a nonmagnetic material between the first and second magnetic poles; a coil at least partly located between the first and second magnetic poles; a recording shield layer made of a magnetic material and positioned on the side of the second magnetic pole opposite from the first magnetic pole; and a recording shield gap layer made of a nonmagnetic material and positioned between the second magnetic pole and the recording shield layer; the recording shield layer covering, by way of the recording shield gap layer, at least both lateral parts of the second magnetic pole on the side of the second magnetic pole facing the recording medium.

In the hard disk drive of the present invention, the recording shield layer covers not only the recording medium flow-out side of the second magnetic pole, but also both lateral parts thereof. This can block external magnetic fields coming from the track width direction of the recording medium.

The present invention provides a method of making a thin-film magnetic head having an inductive type electromagnetic transducer, the method comprising the steps of forming a first magnetic pole, a second magnetic pole magnetically connected to the first magnetic pole at a position separated from a surface facing a recording medium, and a coil at least partly positioned between the first and second magnetic poles; forming a recording shield gap layer made of a nonmagnetic material so as to cover an upper part and both lateral parts of the second magnetic pole on the side of the second magnetic pole facing the recording medium; and forming a recording shield layer made of a magnetic material on the recording shield gap layer so as to cover the upper part and both lateral parts of the second magnetic pole on the side of the second magnetic pole facing the recording medium.

In the method of making a thin-film magnetic head in accordance with the present invention, the recording shield layer is formed by way of the recording shield gap layer so as to cover the upper part and both lateral parts of the second magnetic pole. This can block external magnetic fields coming from the track width direction of the recording medium.

Preferably, in the method of making a thin-film magnetic head in accordance with the present invention, the step of forming the recording shield gap layer includes the substeps of forming respective resist patterns distanced from both lateral sides of the second magnetic pole; laminating a nonmagnetic material on the second magnetic pole and resist patterns; and removing the resist patterns together with the nonmagnetic material on the resist patterns.

In this case, since respective resist patterns are formed with a distance from both lateral side of the second magnetic pole, the laminated nonmagnetic material covers the upper part and both lateral parts of the second magnetic pole, whereby the recording shield gap layer can be formed easily. When the recording shield layer is laminated on thus formed recording shield gap layer, the recording shield layer covers the upper part and both lateral sides of the second magnetic pole, thereby facilitating the process of making the thin-film magnetic head.

BRIEF DESCRIPTION OF THE DRAWINGS

The present invention may be more readily described with reference to the accompanying drawings, in which.

DESCRIPTION OF THE PREFERRED EMBODIMENTS

In the following, preferred embodiments of the present invention will be explained in detail with reference to the accompanying drawings. Constituents identical to each other will be referred to with numerals identical to each other, without repeating their overlapping explanations.

Figure 1:
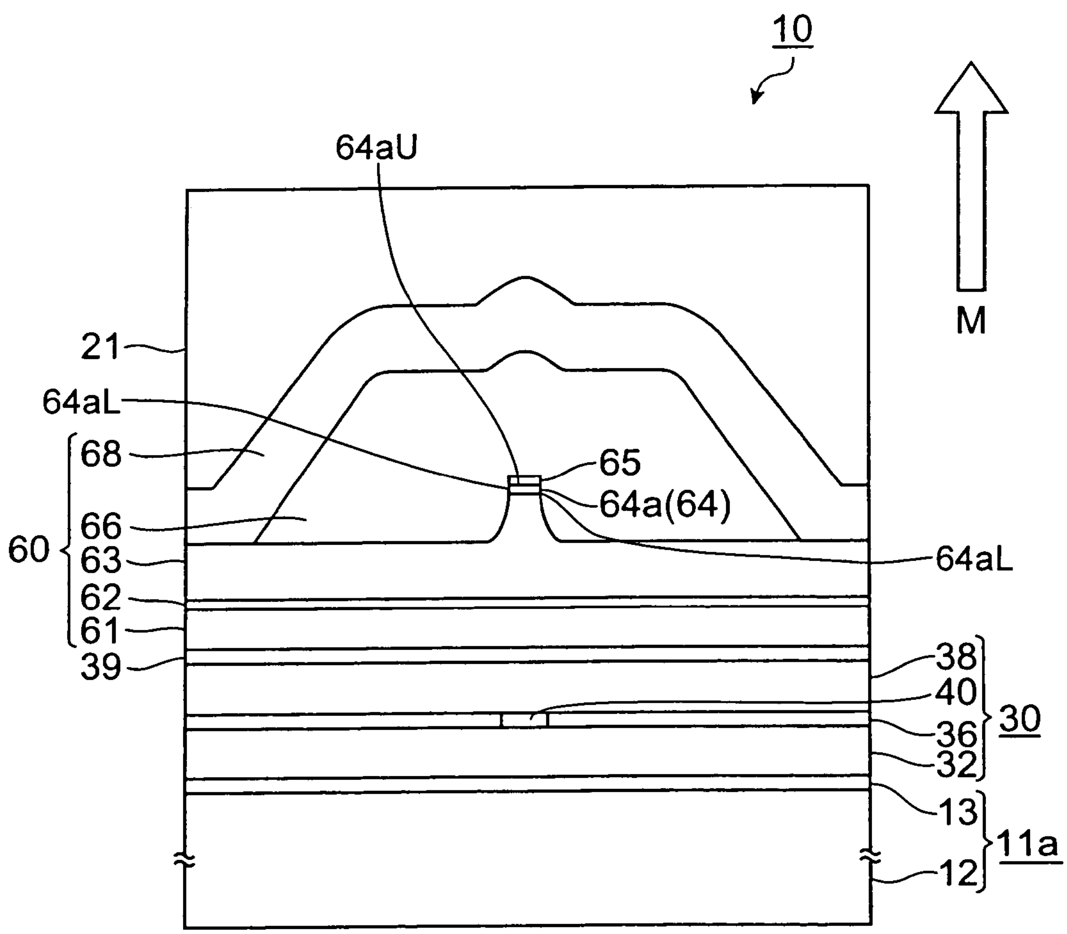
FIG. 1 is a schematic view showing an embodiment of the thin-film magnetic head in accordance with the present invention as seen from the air bearing surface side.

FIG. 1 is a schematic view showing a thin-film magnetic head 10 in accordance with an-embodiment as seen from an air bearing surface (ABS) S as a recording medium facing surface which faces a recording medium such as a hard disk. Arrow M in the drawing indicates the rotating direction of the recording medium. The thin-film magnetic head 10 is a combination thin-film magnetic head in which a reproducing head section 30 having a TMR (Tunnel-type Magneto Resistive) device 40 as a magnetoresistive device, and a recording head section 60 as an inductive type electromagnetic transducer are laminated together. The reproducing head section 30 is formed on a support 11*a* of a head slider. The support 11*a* is constituted by a substrate 12 made of AlTiC ($Al_2O_3$.TiC) or the like, and a foundation layer 13 made of an insulating material laminated thereon. The TMR device utilizes a TMR film yielding a magnetoresistance change ratio higher than that of a GMR film by utilizing a magnetoresistive effect occurring at a tunnel junction.

There producing head section 30 mainly comprises a lower shield layer 32 also acting as a lower electrode; insulating layers 36 disposed at both lateral sides of the TMR device 40; and an upper shield layer 38, formed on the TMR device 40, also acting as an upper electrode. The lower shield layer 32 and the upper shield layer 38 function to prevent the TMR device 40 from sensing unnecessary external magnetic fields. Though not depicted, the TMR device 40 has a TMR film, and magnetic bias application layers which are made of a hard magnet or the like, for example, and disposed on both lateral sides of the TMR film. Words "upper" and "lower" used in the specification as in the shield layers refer to the sides closer to and farther from the support 11*a*.

The recording head section 60 will now be explained. The recording head section 60 is formed on the reproducing head section 30 by way of an insulating layer 39, and acts as an inductive type electromagnetic transducer for perpendicular recording. It is not always necessary to provide the insulating layer 39. The recording head section 60 comprises an auxiliary magnetic pole (first magnetic pole) 61 made of a soft magnetic material; a nonmagnetic layer 62 on which a thin-film coil 70 (see FIG. 2A) is laminated; a gap layer 63 made of a nonmagnetic insulating material formed thereon; a magnetic pole part layer (apart of a second magnetic pole) 64*a* at least partly formed on the gap layer 63; and a nonmagnetic layer 65 laminated on the magnetic pole part layer 64*a*. The magnetic pole part layer 64*a* holds the gap layer 63 between it and the auxiliary magnetic pole 61, and is magnetically connected to the auxiliary magnetic pole 61 at a position separated from the air bearing surface S.

The auxiliary magnetic pole 61 is formed with a thickness of about 1 μm to about 2 μm from permalloy (NiFe), for example.

The gap layer 63 is formed from alumina ($Al_2O_3$), for example, preferably such that the region (near the center in the track width direction of the recording medium) formed with the magnetic pole part layer 64*a* becomes the thickest. The thickest part is set to about 2 μm to about 6 μm, for example.

The magnetic pole part layer 64*a* constitutes a main magnetic pole (second magnetic pole) 64 (see FIG. 2A) together with a yoke part layer 64*b* which will be explained later. The magnetic pole part layer 64*a* can be formed not only from permalloy (NiFe), for example, but also from (1) materials including iron and nitrogen atoms; (2) materials including iron, zirconia, and oxygen atoms; (3) materials including iron and nickel elements; and the like. The thickness of the magnetic pole part layer 64*a* is about 0.1 μm to about 0.8 μm, for example, preferably about 0.3 μm to about 0.8 μm. When a recording current is caused to flow through the thin-film coil 70 (see FIG. 2A), a magnetic flux occurs from the magnetic pole part layer 64*a*, whereby information can be recorded to a recording medium such as a hard disk.

The nonmagnetic layer 65 can be formed from an inorganic, electrically nonconductive, nonmagnetic material such as a material including titanium or tantalum, alumina, or silicon oxide, for example. Such a nonmagnetic layer 65 can prevent the upper face of the magnetic pole part layer 64*a* from being damaged when forming the magnetic pole part layer 64*a* by dry etching and the like, whereby the upper face can keep its flatness. It is not always necessary to provide the nonmagnetic layer 65, however.

In the thin-film magnetic head of this embodiment, a recording shield gap layer 66 made of a nonmagnetic material is laminated so as to cover the upper part 64*a*U and both lateral parts 64*a*L of the magnetic pole part layer 64*a*. Further, by way of the layer 66, a recording shield layer 68 made of a soft magnetic material for blocking external magnetic fields is formed so as to cover the upper part 64*a*U and both lateral parts 64*a*L of the magnetic pole part layer 64*a* on the air bearing surface S side. The recording shield layer 68 is located on the opposite side (the recording medium flow-out side) of the magnetic pole part layer 64*a* from the auxiliary magnetic pole 61. The recording shield gap layer 66 is formed so as to prevent magnetic fluxes of the magnetic pole part layer 64*a* from leaking toward the recording shield layer 68, and suppress the magnetic connection between the magnetic pole part layer 64*a* and recording shield layer 68 at the time of recording. For protecting the thin-film magnetic head 10, an overcoat layer 21 made of an insulating material such as $Al_2O_3$ is formed on the recording shield layer 68.

The recording shield gap layer 66 can be formed from $Al_2O_3$ or the like, for example, with a thickness of about 2 μm to about 6 μm. Preferably, the thickness of the recording shield gap layer 66 is about 0.8 to 2 times that of the gap layer 63. This range is determined by the degrees of the external magnetic field shielding effect and the magnetic connection between the magnetic pole part layer 64*a* and the recording shield layer 68 at the time of recording. In the recording shield gap layer 66, the center part in the track width direction is the highest. This can make the distance from the magnetic pole part layer 64*a* to the recording shield layer 68 substantially constant. The upper face of the recording shield gap layer 66 is not flat throughout the track width direction, while its width is narrower than the gap layer 63. As a consequence, the recording shield layer 68 has a substantially arched form covering the upper part 64*a*U and both lateral parts 64*a*L of the magnetic pole part layer 64*a* as mentioned above. In other words, the recording shield layer 68 is laminated on the recording shield gap layer 66 so as to come into contact with the gap layer 63, thereby inevitably covering the upper part 64*a*U and both lateral parts 64*a*L of the magnetic pole part layer 64*a*.

Preferably, the recording shield gap layer 66 is formed from a nonmagnetic, inorganic material such as alumina or silicon oxide. When formed from an inorganic material, the recording shield gap layer 66 yields a higher mechanical strength and superior chemical and heat resistances as compared with the case formed with an organic material. Therefore, the recording shield gap layer 66 can be restrained from being damaged when coming into contact with the recording medium, and its thermal shrinkage can be suppressed.

The recording shield layer 68 can be formed from a soft magnetic layer such as permalloy, for example, preferably with a thickness of about 1 μm to about 4 μm. The width of the recording shield layer 68 from its center to a location in contact with the gap layer 63 in the left to right direction (track width direction) is about 2 μm to about 10 μm, for example.

Thus configured thin-film magnetic head 10 yields the following effects. Namely, the recording shield layer 68 covers not only the upper part 64*a*U (the recording medium flow-out side, i.e., the side indicated by arrow M) in the magnetic pole part layer 64*a* on the air bearing surface S side, but also both lateral parts 64*a*L (specifically both lateral sides in the track width direction of the recording medium) thereof. This can block external magnetic fields coming from the track width direction of the recording medium, thereby improving the reliability in recording. Similar effects can also be obtained when the thin-film magnetic head 10 is utilized for longitudinal recording instead of perpendicular recording, i.e., when in-plane recording is effected in a recording medium by a leakage magnetic field between the second magnetic pole including the magnetic pole part layer 64*a* and the first magnetic pole corresponding to the auxiliary magnetic pole.

Figure 2A:
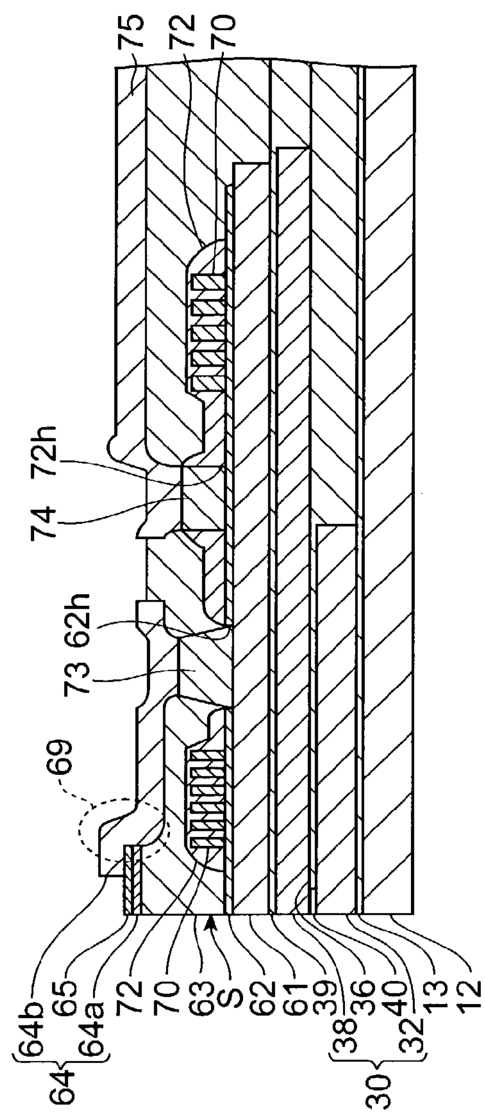
FIGS. 2A and 2B are views showing a step of making the thin-film magnetic head, illustrating a state formed with a main magnetic pole (second magnetic pole)
Figure 2B:
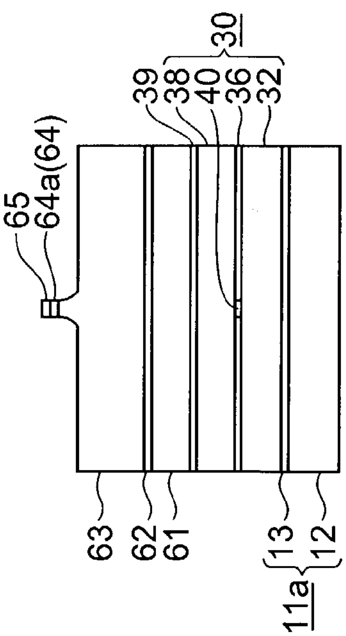

A method of making the thin-film magnetic head 10 in accordance with this embodiment will now be explained. FIGS. 2A and 2B are views showing a stage formed with a main magnetic pole (second magnetic pole) 64. The drawings suffixed with A are sectional views taken along a direction perpendicular to the air bearing surface (ABS) S, whereas those suffixed with B are schematic views seen from the air bearing surface S.

To begin with, a process carried out until the main magnetic pole 64 is formed will be explained in brief. In general, a plurality of thin-film magnetic heads 10 are formed on a single substrate 12. First, a foundation layer 13 made of an insulating material such as alumina ($Al_2O_3$) is formed with a thickness of about 1 μm to about 10 μm on a substrate 12 made of AlTiC ($Al_2O_3$.TiC) or the like. Subsequently, on the foundation layer 13, a lower shield layer 32 made of a magnetic material such as permalloy is formed with a thickness of about 1 μm to about 3 μm by sputtering, for example. The surface excluding the part formed with the lower shield layer 32 is filled with an insulating layer such as alumina until its height is flush with the lower shield layer 32.

Then, a TMR device 40 is formed on the lower shield layer 32. Specifically, a free layer made of a ferromagnetic material such as NiFe or CoFe; a tunnel barrier layer made of an insulating material such as $Al_2O_3$, NiO, MgO, or $TiO_2$; a pinned layer made of a ferromagnetic material such as Fe, Co, Ni, or CoFe; and a pinning layer made of an antiferromagnetic material such as PtMn, for example, which can fix the magnetizing direction of the pinned layer are laminated in this order by sputtering, for example, whereby a TMR film is obtained. Preferably, a cap layer for preventing the TMR film from oxidizing is formed on the pinning layer.

After the layers of the TMR film are laminated, the TMR film is formed into a desirable narrow pattern by photolithography, electron beam lithography, or the like. Then, a pair of magnetic bias application layers are formed on both lateral sides of the TMR film by sputtering, for example, whereby the TMR device 40 is obtained. The magnetic bias application layers are formed from a high-coercivity material such as CoPt, for example.

Subsequently, an insulating layer 36 made of $Al_2O_3$ or the like is formed by sputtering, for example, so as to cover the lower shield layer 32 and the TMR device 40. Further, the upper shield layer 38 is formed by plating, for example, so as to cover the TMR device 40 and the insulating layer 36.

Next, an insulating layer 39 made of an insulating material such as $Al_2O_3$ is formed with a thickness of about 0.1 μm to about 0.5 μm by sputtering, for example. Subsequently, an auxiliary magnetic pole 61 made of permalloy is formed on the insulating layer 39 by sputtering, for example, and then a nonmagnetic layer 62 is formed on the auxiliary magnetic pole 61 by sputtering, for example. The nonmagnetic layer 62 is formed with a contact hole 62*h* by photolithography and dry etching. Subsequently, a thin-film coil 70 is formed on the nonmagnetic layer 62 with a thickness of about 1 μm to about 3 μm by using photolithography, plating, and the like, and then a photoresist layer 72 is formed on the thin-film coil 70. A part of the thin-film coil 70 is positioned between the auxiliary magnetic pole 61 and the main magnetic pole 64. The thin-film coil 70 may also comprise a plurality of layers instead of a single layer.

Next, a connecting part 73 made of permalloy or a high saturated magnetic flux density material, for example, is formed by plating or the like on the auxiliary magnetic pole 61 and its surroundings at the position formed with the contact hole 62*h*. The connecting part 73 may have a substantially rectangular parallelepiped form, for example, with a thickness of 2 μm to 4 μm, a depth (in the left to right direction of FIG. 2) of 2 μm to 10 μm, and a width of 5 μm to 20 μm. On the deeper side (the right side in the drawing) of the photoresist layer 72, a contact hole 72*h* is formed by a photolithography technique, and then a coil contact part 74 is formed within the contact hole 72*h* by sputtering or plating, for example. The coil contact part 74 is in contact with the thin-film coil 70 at a position not depicted.

Next, a nonmagnetic material to become a gap layer 63 is laminated so as to cover the photoresist layer 72 by sputtering, for example, and then the surface of thus formed layer is polished so as to be flattened. Subsequently, the nonmagnetic layer to become the gap layer 63 is formed with a magnetic layer to become a magnetic pole part layer 64*a* by sputtering or plating, for example. Further, on this magnetic layer, a layer to become a nonmagnetic layer 65 is formed by sputtering.

Subsequently, a mask layer for patterning the magnetic pole part layer 64*a* and the nonmagnetic layer 65 is formed on the layer to become the nonmagnetic layer 65. Then, etching such as ion milling is carried out while using the mask layer, so as to define an outer shape of the magnetic pole part layer 64*a* and nonmagnetic layer 65. Here, since the upper face of the magnetic pole part layer 64*a* is covered with the nonmagnetic layer 65, the magnetic pole part layer 64*a* can be restrained from being damaged by the etching. Also, the upper face of the connecting part 73 and coil contact part 74 is exposed by the etching.

Figure 3:
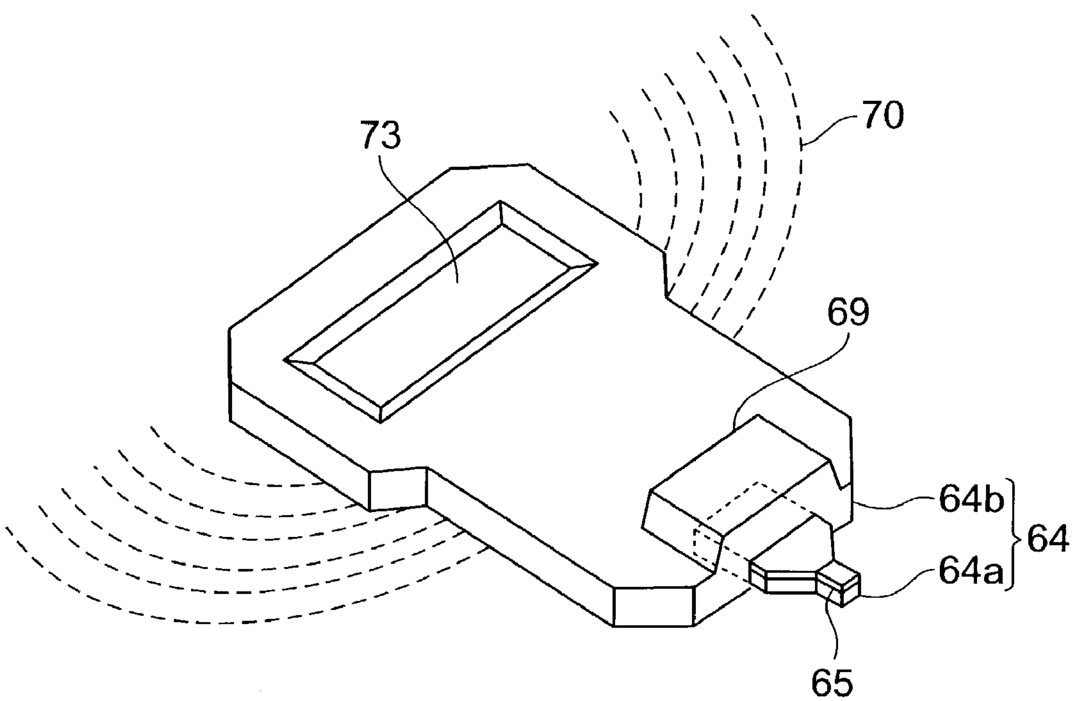
FIG. 3 is a perspective view showing a magnetic pole part layer and its vicinity.

FIG. 3 is a perspective view of the magnetic pole part layer 64*a* and its vicinity. As depicted, the magnetic pole part layer 64*a* has a narrow leading end part (on the air bearing surface side), an intermediate part gradually widening from the leading end part to the deeper side, and a substantially rectangular parallelepiped rear part. The nonmagnetic layer 65 has a two-dimensional form similar to that of the magnetic pole part layer 64*a*.

Referring to FIGS. 2A and 2B again, the subsequent manufacturing step will be explained. After the outer shape of the magnetic pole part layer 64*a* is determined, a photoresist forms a resist cover covering a part of the magnetic pole part layer 64*a* and nonmagnetic layer 65 on the air bearing surface S side by using a photolithography technique. Then, an electrode film for electroplating is formed by sputtering so as to cover the resist cover, gap layer 63, connecting part 73, and coil contact part 74.

Subsequently, a resist frame having an aperture corresponding to the form of a yoke part layer 64*b*, which will be explained later, on the air bearing surface S side, and an aperture corresponding to the form of a lead layer 75 of the thin-film coil 70 on the deeper side are formed on the electrode film. Then, using this resist frame, the yoke part layer 64*b* and the lead layer 75 are formed on the electrode film by frame plating.

The yoke part layer 64*b* constituting the main magnetic pole 64 (second magnetic pole) together with the magnetic pole part layer 64*a* covers the deeper side of the magnetic pole part layer 64*a* and nonmagnetic layer 65 as shown in FIG. 3. The magnetic pole part layer 64*a* is set so as to have a saturated magnetic flux density not lower than that of the yoke part layer 64*b*. For example, the magnetic pole part layer 64*a* is formed from a material having a saturated magnetic flux density of 2.0 T or higher, whereas the yoke part layer 64*b* is formed from a material having a saturated magnetic flux density of about 1.9 T. The yoke part layer 64*b* is formed with a stepped part 69 with a changed height.

The foregoing manufacturing process yields the state shown in FIG. 2A. Subsequent manufacturing steps will now be explained.

Figure 4A:
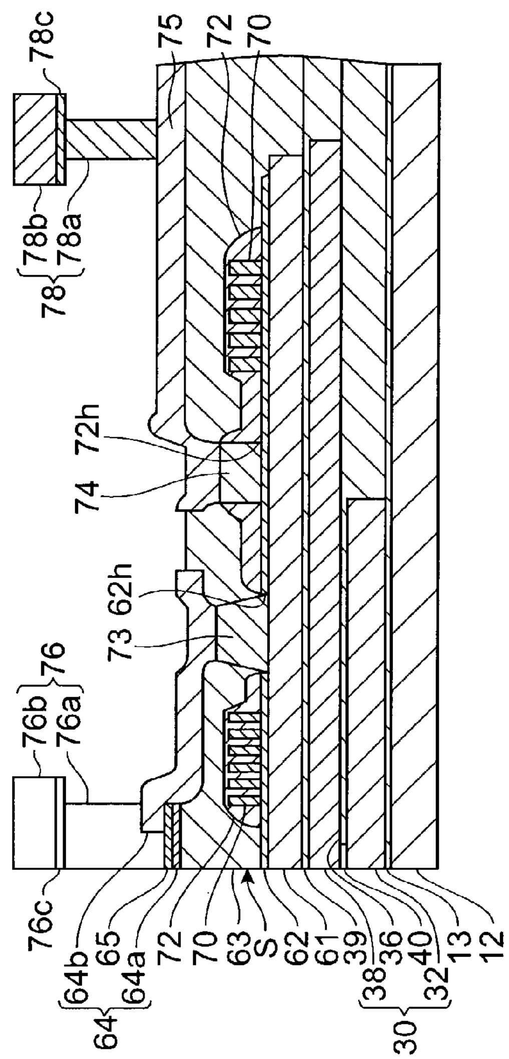
FIGS. 4A and 4B are views showing a state formed with resist patterns.
Figure 4B:
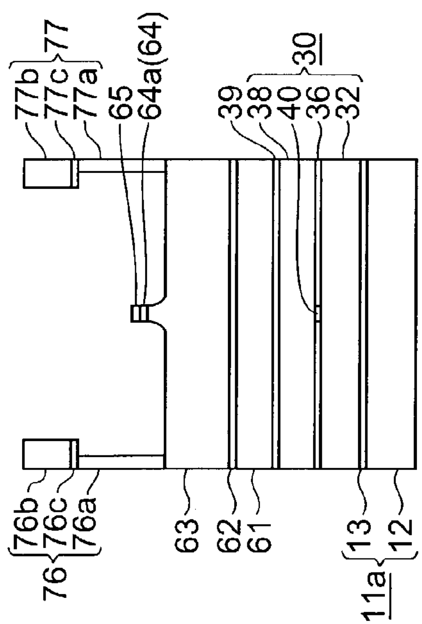

As shown in FIGS. 4A and 4B, a pair of resist patterns 76, 77 are formed on the gap layer 63 on the air bearing surface S side with a distance from both lateral sides of the magnetic pole part layer 64*a* in the track width direction such that the magnetic pole part layer 64*a* is located therebetween. On the other hand, a resist pattern 78 is formed on the lead layer 75. Each of the resist patterns 76, 77, 78 has a double layer structure having a lower pattern 76*a*, 77*a*, 78*a* and an upper pattern 76*b*, 77*b*, 78*b*. The upper pattern in each of the resist patterns 76, 77, 78 is wider than the lower pattern, whereby each resist pattern has a substantially T-shaped cross section. In order to prevent the respective resist materials of the lower and upper patterns from intermixing, the bottom part of the upper pattern is formed with a barrier pattern 76*c*, 77*c*, 78*c* made of carbon, diamond like carbon (DLC), fluorine contained resine, alumina, or the like.

An example of the method of making each resist pattern 76, 77, 78 having such a double layer structure will now be explained. First, a resist is applied to the state shown in FIG. 2A, so as to form a lower resist layer for the lower patterns 76*a*, 77*a*, 78*a*. For this resist, a positive resist such as novolac type i-line resist (SIPR-9281 manufactured by Shin-Etsu Chemical Co., Ltd.), for example, can be used. Subsequently, the lower resist layer is exposed to light by way of a mask. Thereafter, carbon is vapor-deposited on the lower resist layer, so as to form a barrier layer for the barrier patterns 76*c*, 77*c*, 78*c*. Subsequently, the same resist material as with the lower resist layer is applied onto the barrier layer, so as to form an upper resist layer for the upper patterns 76*b*, 77*b*, 78*b*. Then, the upper resist layer is exposed to light by way of a mask.

Next, the upper resist layer is developed with an alkaline developing solution, washed with water, and dried, so as to yield the upper patterns 76*b*, 77*b*, 78*b*. For example, SSFD-238 manufactured by Shin-Etsu Chemical Co., Ltd. can be utilized as the developing solution. Subsequently, the exposed part of the barrier layer is eliminated by an ashing apparatus, so as to yield the barrier patterns 76*c*, 77*c*, 78*c*. Then, the lower resist layer is developed with an alkaline developing solution, washed with water, and dried, so as to form the lower patterns 76*a*, 77*a*, 78*a*, there by yielding the resist patterns 76, 77, 78 shown in FIGS. 4A and 4B.

Figure 5A:
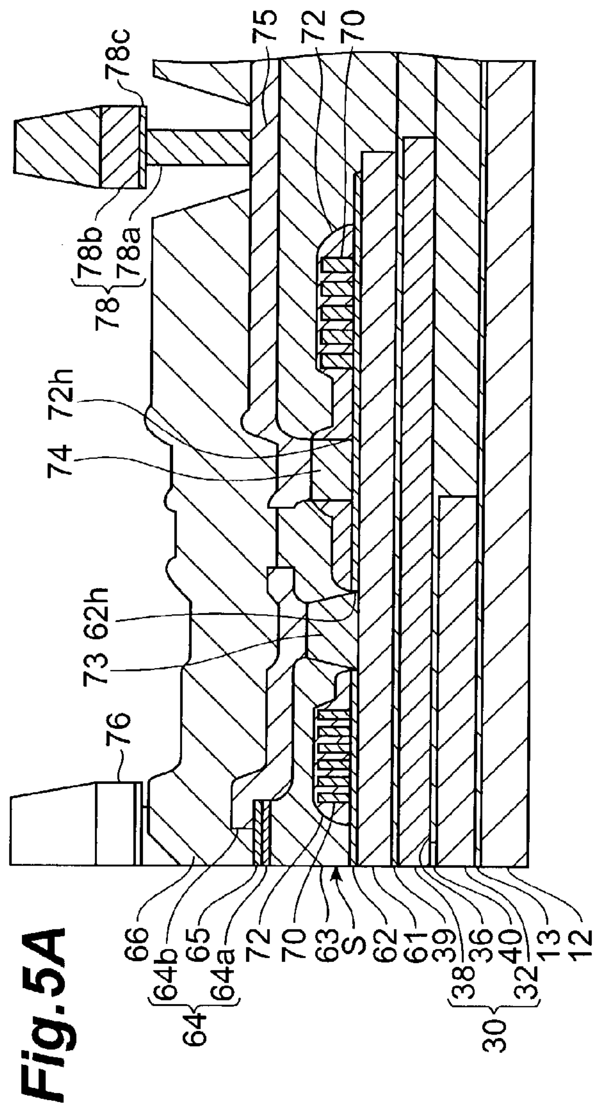
FIGS. 5A and 5B are views showing a state formed with a nonmagnetic material to become a gap layer.
Figure 5B:
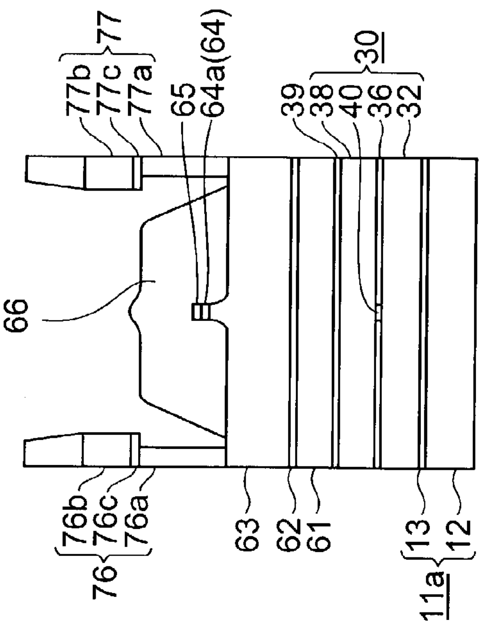

With reference to FIGS. 5A and 5B, the subsequent step will now be explained. After the resist patterns 76, 77, 78 are formed as mentioned above, a nonmagnetic material made of alumina or the like is laminated on the gap layer 63 and resist patterns 76, 77, 78 by sputtering, for example, so as to form a recording shield gap layer 66. Here, the resist patterns 76, 77 define the form of the nonmagnetic material laminated on the gap layer 63 and magnetic pole part layer 64*a*, whereby the recording shield gap layer 66 can easily attain the structure shown in FIG. 1 (see FIG. 5B). Namely, the width of the recording shield gap layer 66 in the track width direction becomes narrower than the gap layer 63, thereby covering the upper part 64*a*U and both lateral parts 64*a*L of the magnetic pole part layer 64*a*.

Figure 6A:
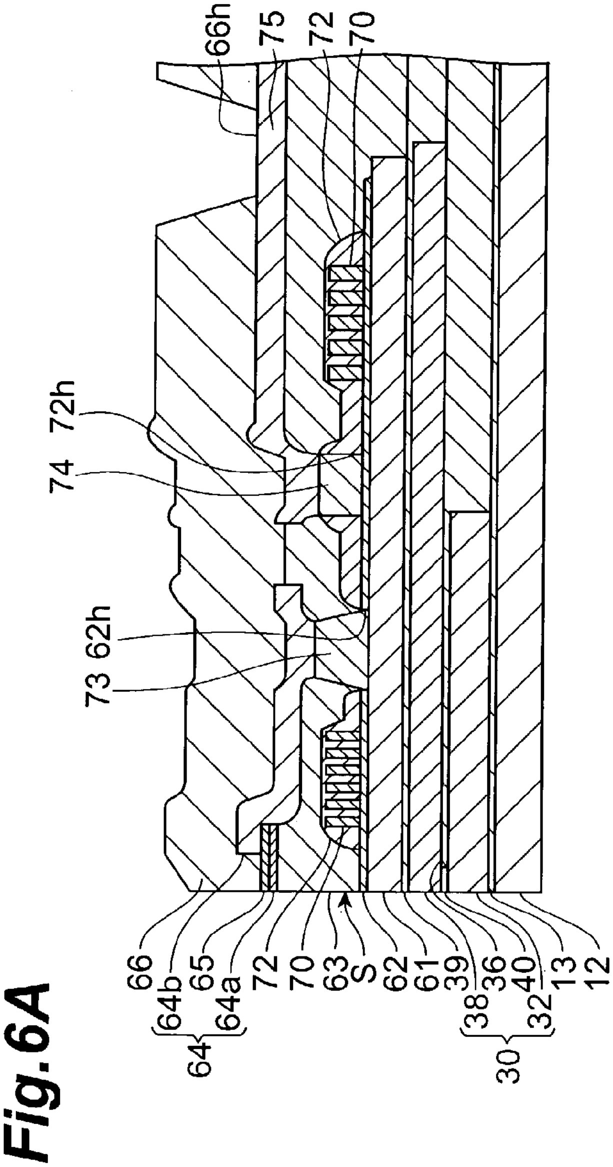
FIGS. 6A and 6B are views showing a state where the resist patterns are lifted off together with the nonmagnetic material formed thereon.
Figure 6B:
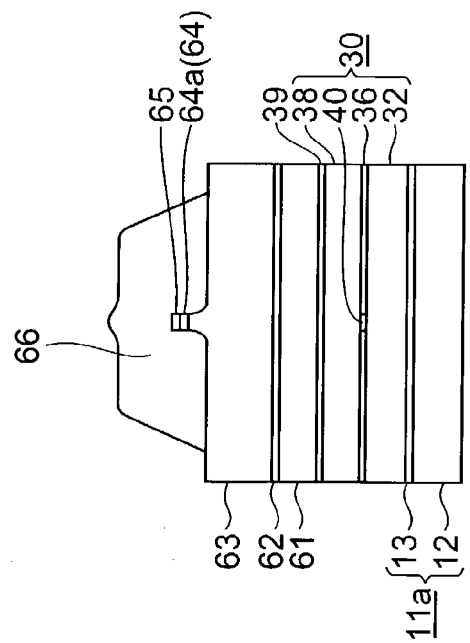

Next, as shown in FIGS. 6A and 6B, the resist patterns 76, 77, 78 are removed by lifting off together with the nonmagnetic material laminated thereon. A hole 66 his formed at the location having removed the resist pattern 78.

Figure 7A:
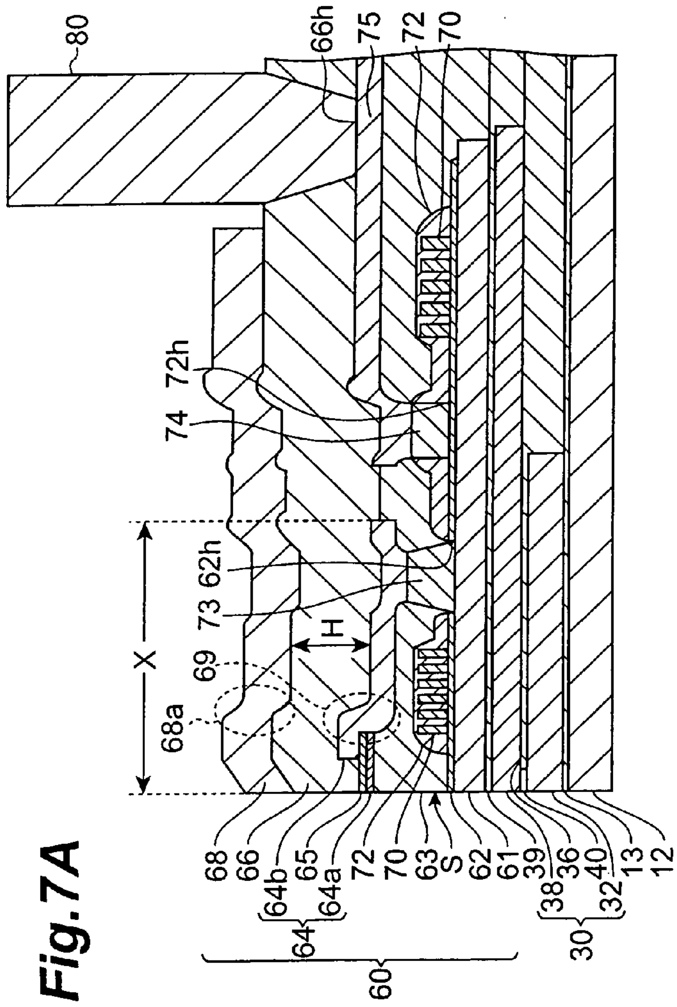
FIGS. 7A and 7B are views showing a state formed with a recording shield layer and a straight bump.
Figure 7B:
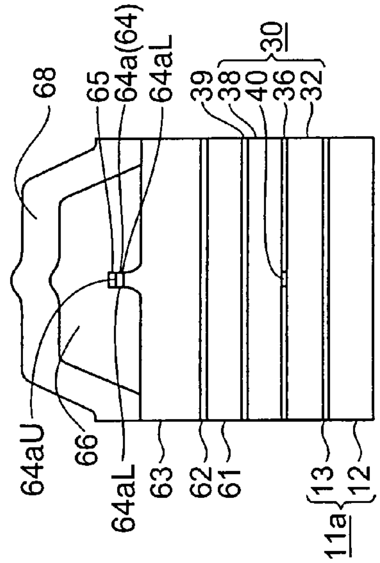

Subsequently, as shown in FIGS. 7A and 7B, a recording shield layer 68 is formed by plating while keeping the form of the upper face of the recording shield gap layer 66, i.e., without flattening. Specifically, Ti (100 nm) and NiFe (50 nm) are laminated in this order by sputtering, and frame plating is effected while using the resulting laminate as an electrode film. Here, permalloy may be laminated to a desirable thickness by sputtering instead of plating.

The recording shield layer 68 is laminated so as to cover the recording shield gap layer 66, thereby conforming to the form of the latter. Therefore, as shown in FIG. 7B, the recording shield layer 68 covers the upper part 64*a*U and both lateral parts 64*a*L of the magnetic pole part layer 64*a* on the air bearing surface side by way of the recording shield gap layer 66. This can block external magnetic fields coming from the track width direction of the recording medium as mentioned above, whereby the reliability of recording improves.

As shown in FIG. 7A, the recording shield layer 68 is formed on the recording shield gap layer 66 whose upper face is not flattened, and thus has a substantially constant distance H to the main magnetic pole (second magnetic pole) 64 within the area X in which the magnetic pole part layer 64*a* and the yoke part layer 64*b* exist. Consequently, the recording shield layer 68 can approach the magnetic pole part layer 64*a*, so as to enhance the external magnetic field shielding effect, while restraining magnetic fluxes of the yoke part layer 64*b* from leaking toward the recording shield layer 68 at the time of recording to the recording medium.

As mentioned above, the yoke part layer 64*b* is formed with the stepped part 69 with a changed height. This stepped part is reflected in the recording shield gap layer 66, and further in the recording shield layer 68. Hence, the recording shield layer 68 has a step 68*a* at a location (on the upper side in the drawing) corresponding to the position of the stepped part 69 in the yoke part layer 64*b*. Such a configuration can reduce the difference in distance between the yoke part layer 64*b* and the recording shield layer 68 on the front and rear sides of step 69 in the yoke part layer 64*b* as seen from the air bearing surface S. This can restrain magnetic fluxes of the yoke part layer 64*b* from leaking toward the recording shield layer 68 at the time of recording to the recording medium.

After forming the recording shield layer 68, the hole 66*h* is formed with a straight bump 80 by plating. Specifically, Ti (100 nm) and Cu (100 nm) are laminated in this order on the lead layer 75 within the hole 66*h* by sputtering, and then, while using the resulting laminate as an electrode film, Cu is frame-plated. The straight bump 80 is electrically connected to the thin-film coil 70 by way of the lead layer 75 and coil contact part 74, and to recording pads 18*a*, 18*b* (see FIG. 10) which will be explained later. The foregoing process yields the recording head section 60 of the thin-film magnetic head 10.

Figure 8A:
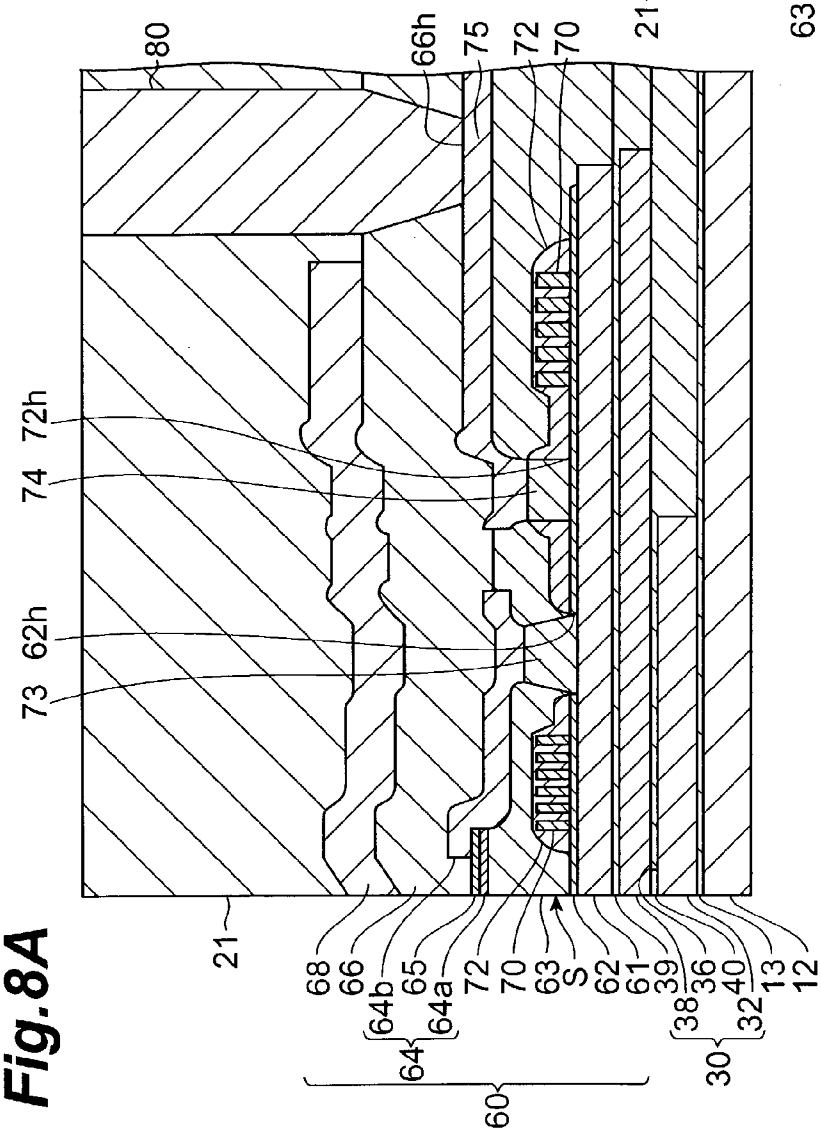
FIGS. 8A and 8B are views showing a state formed with an overcoat layer.
Figure 8B:
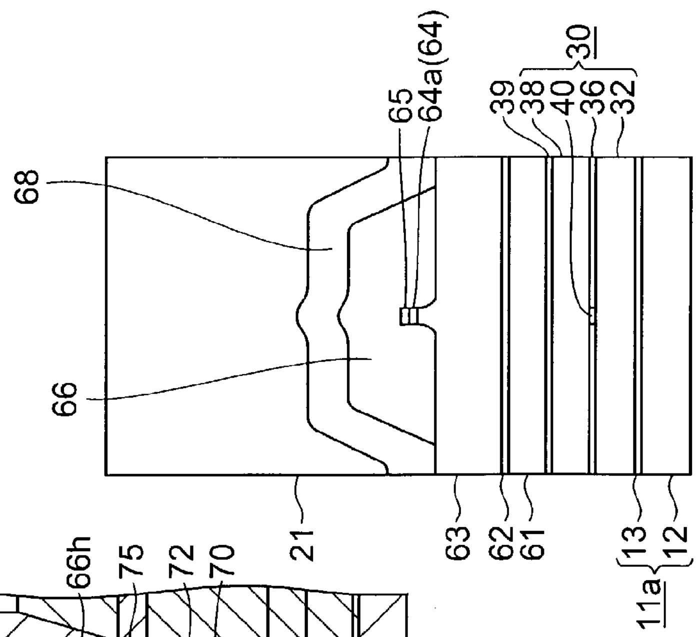

Next, as shown in FIGS. 8A and 8B, an overcoat layer 21 made of an insulating material such as $Al_2O_3$ is formed with a thickness of about 20 μm to about 30 μm by sputtering, for example, whereby the thin-film magnetic head 10 in accordance with this embodiment is completed. Since a plurality of thin-film magnetic heads 10 are formed on a single substrate 12, the latter is cut by dicing into blocks each having a thin-film magnetic head 10. Subsequently, a slider rail is formed by ion milling or the like, whereby a head slider 11 is obtained (see FIG. 10).

A head slider, a head gimbal assembly, and a hard disk drive which use the above-mentioned thin-film magnetic head 10 will now be explained.

Figure 9:
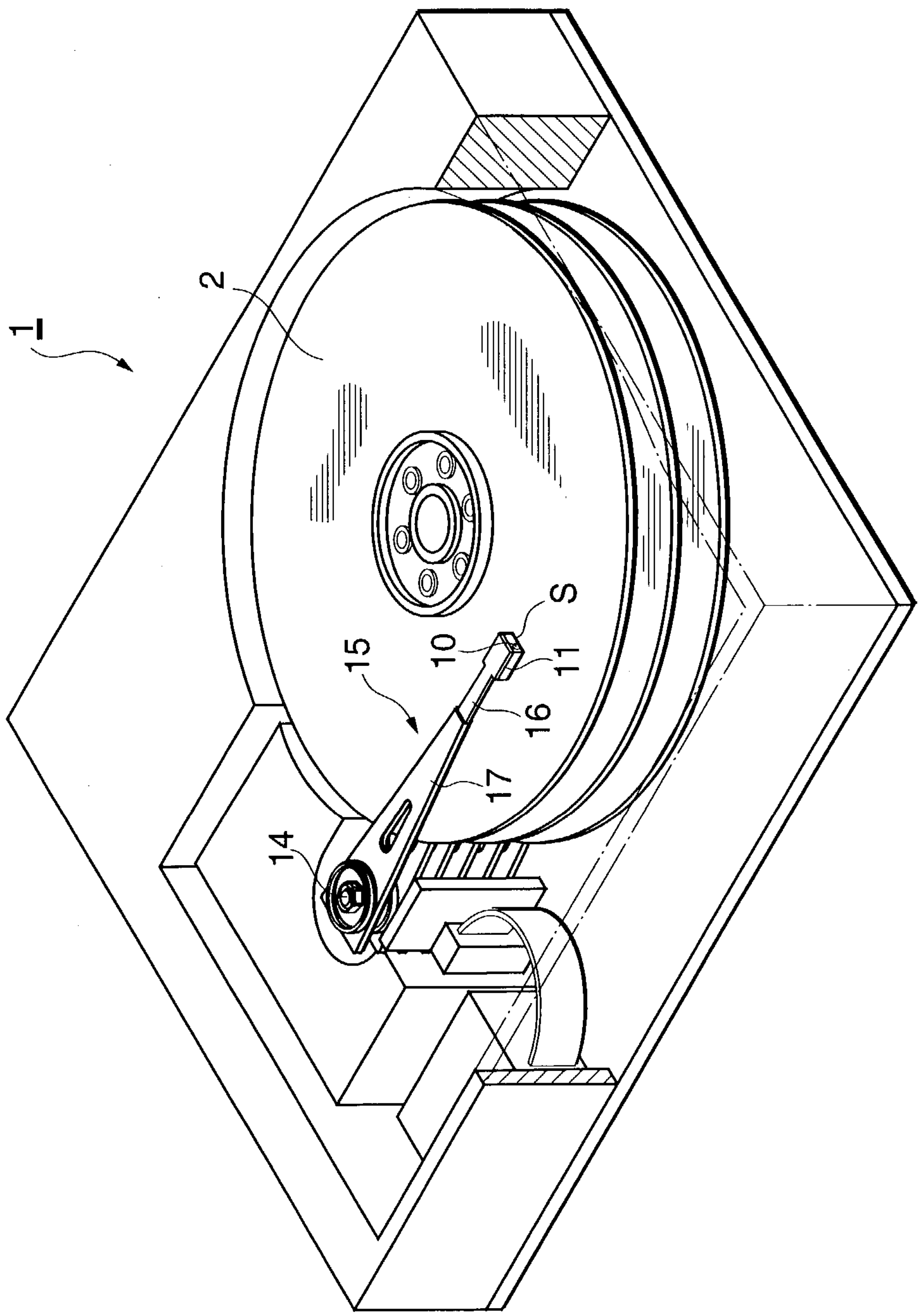
FIG. 9 is a perspective view showing an embodiment of the hard disk drive in accordance with the present invention.

FIG. 9 is a view showing a hard disk drive equipped with the thin-film magnetic head 10. The hard disk drive 1 actuates a head gimbal assembly (HGA) 15, so as to cause the thin-film magnetic head 10 to record and reproduce magnetic information with respect to a recording surface (the upper face in FIG. 9) of a hard disk 2 rotating at a high speed. The head gimbal assembly 15 comprises a gimbal 16 mounted with the head slider 11 formed with the thin-film magnetic head 10, and a suspension arm 17 connected thereto, while being rotatable about a shaft 14 by a voice coil motor, for example. When the head gimbal assembly 15 is rotated, the head slider 11 moves radially of the hard disk 2, i.e., in a direction traversing track lines.

Figure 10:
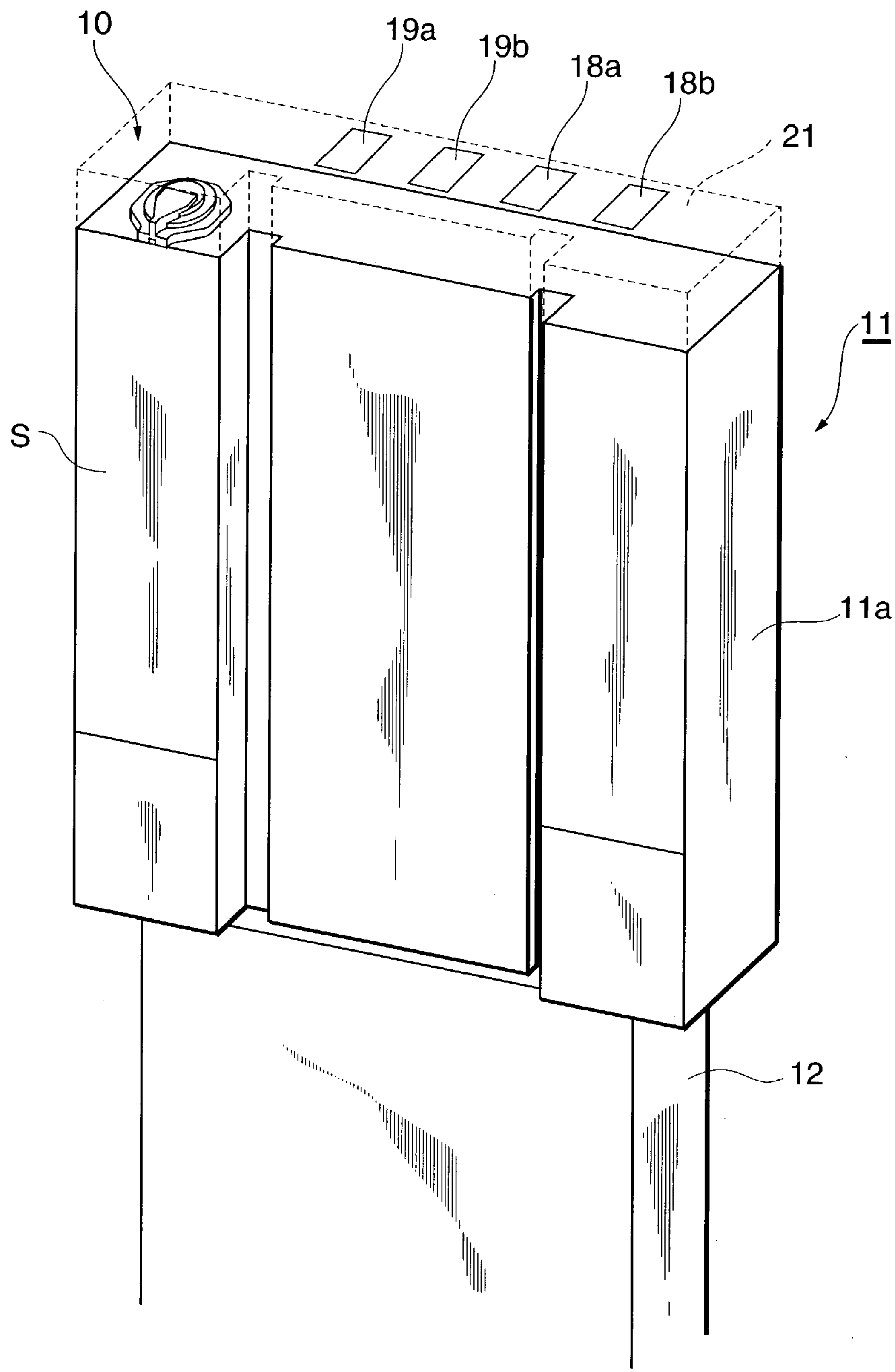
FIG. 10 is a perspective view showing an embodiment of the head slider in accordance with the present invention.
Figure 11:
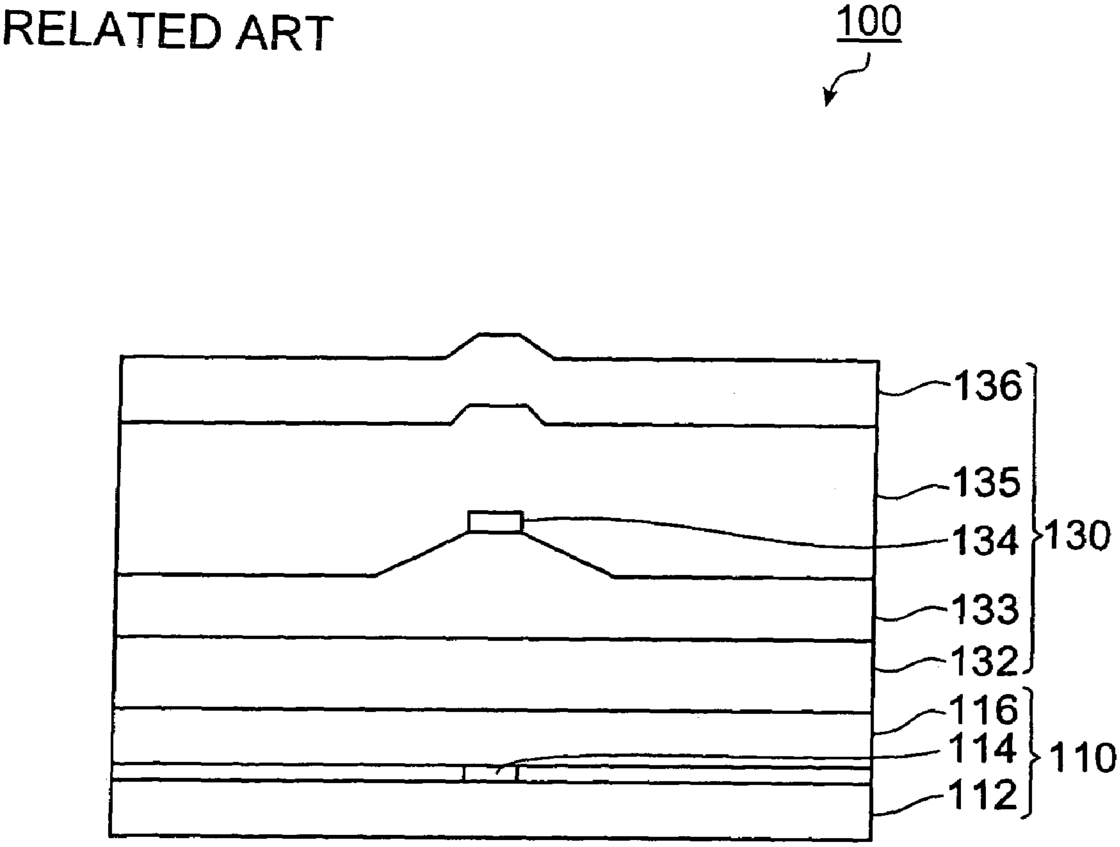
FIG. 11 is a schematic view showing a conventional thin-film magnetic head.

FIG. 10 is an enlarged perspective view of the head slider 11. The head slider 11 has a substantially rectangular parallelepiped form, and comprises a support 11*a* on which the thin-film magnetic head 10 is formed. The surface on the front side of the drawing is the air bearing surface S facing the recording surface of the hard disk 2. When the hard disk 2 rotates, the head slider 11 floats up because of an airflow caused by the rotation, whereby the air bearing surface S is separated from the recording surface of the hard disk 2. Recording pads 18*a*, 18*b* and reproducing pads 19*a*, 19*b* are connected to the thin-film magnetic head 10, whereas wires (not depicted), to be connected to the pads, for inputting and outputting electric signals are attached to the suspension arm 17 (shown in FIG. 9). The recording pads 18*a*, 18*b* are electrically connected to the thin-film coil 70 by way of the straight bump 80 (see FIG. 8A) and the like, whereas the reproducing pads 19*a*, 19*b* are electrically connected to the TMR device 40.

In the foregoing head slider 1, head gimbal assembly 15, and hard disk drive 1, the recording shield layer 68 of the recording head section 60 in the thin-film magnetic head 10 covers not only the flow-out side of the hard disk 2 in the yoke part layer 64*b* but also both lateral sides thereof (see FIG. 1). This can block external magnetic fields coming from the track width direction of the recording medium, and can respond to the hard disk 2 having a high areal density.

Though the invention achieved by the inventors is specifically explained with reference to embodiments, the present invention should not be restricted to the above-mentioned embodiments. For example, the second magnetic pole may be integrated without being separated into the magnetic pole part layer and the yoke part layer. The upper part and both lateral parts of the layer recording shield layer may be formed separately from each other. The recording gap layer and recording shield gap layer may be formed thinner, so as to combine the auxiliary magnetic pole and the recording shield layer together in the surface facing the recording medium. Preferably, the height of the recording shield layer (in the MR height direction) is set higher than the main magnetic pole and the auxiliary magnetic pole.

The reproducing head section may employ AMR (Anisotropic Magneto Resistive) devices utilizing anisotropic magnetoresistive effects, GMR (Giant Magneto Resistive) devices utilizing giant magnetoresistive effects, and the like instead of the TMR device. The thin-film magnetic head may also be of type not equipped with a reproducing head section.

As explained in the foregoing, the present invention can improve the external magnetic field blocking effect, thereby being able to enhance the reliability of a hard disk drive.

The basic Japanese Application No. 2002-171475 filed on Dec. 20, 2002 is hereby incorporated by reference.

What is claimed is:

1. A thin-film magnetic head comprising:

a first magnetic pole;

a second magnetic pole, magnetically connected to said first magnetic pole at a position separated from a surface facing a recording medium, holding a gap layer made of a nonmagnetic material between said first and second magnetic poles;

a coil at least partly located between said first and second magnetic poles;

a recording shield layer made of a magnetic material and positioned on the side of said second magnetic pole opposite from said first magnetic pole; and a recording shield gap layer made of a nonmagnetic material and positioned between said second magnetic pole and said recording shield layer;

said recording shield layer covering, by way of said recording shield gap layer, at least both lateral parts of said second magnetic pole on the side of said second magnetic pole facing the recording medium, wherein said second magnetic pole has a stepped part with a changed height; and wherein said recording shield layer has a step at a position corresponding to said stepped part in said second magnetic pole.

2. A thin-film magnetic head according to claim 1, wherein said recording shield layer has a substantially constant distance to said second magnetic pole in a depth direction from said surface facing the recording medium.

3. A thin-film magnetic head according to claim 1, wherein at least the part facing the recording medium in said recording shield gap layer is formed from a nonmagnetic inorganic material.

4. A head slider comprising a thin-film magnetic head having an inductive type electromagnetic transducer, said inductive type electromagnetic transducer comprising:

a first magnetic pole;

a second magnetic pole, magnetically connected to said first magnetic pole at a position separated from a surface facing a recording medium, holding a gap layer made of a nonmagnetic material between said first and second magnetic poles;

a coil at least partly located between said first and second magnetic poles;

a recording shield layer made of a magnetic material and positioned on the side of said second magnetic pole opposite from said first magnetic pole; and a recording shield gap layer made of a nonmagnetic material and positioned between said second magnetic pole and said recording shield layer;

said recording shield layer covering, by way of said recording shield gap layer, at least both lateral parts of said second magnetic pole on the side of said second magnetic pole facing the recording medium, wherein said second magnetic pole has a stepped part with a changed height, and said recording shield layer has a step at a position corresponding to said stepped part in said second magnetic pole.

5. A head gimbal assembly comprising a thin-film magnetic head having an inductive type electromagnetic transducer, said inductive type electromagnetic transducer comprising:

a first magnetic pole;

a second magnetic pole, magnetically connected to said first magnetic pole at a position separated from a surface facing a recording medium, holding a gap layer made of a nonmagnetic material between said first and second magnetic poles;

a coil at least partly located between said first and second magnetic poles;

a recording shield layer made of a magnetic material and positioned on the side of said second magnetic pole opposite from said first magnetic pole; and a recording shield gap layer made of a nonmagnetic material and positioned between said second magnetic pole and said recording shield layer;

said recording shield layer covering, by way of said recording shield gap layer, at least both lateral parts of said second magnetic pole on the side of said second magnetic pole facing the recording medium, wherein said second magnetic pole has a stepped part with a changed height, and said recording shield layer has a step at a position corresponding to said stepped part in said second magnetic pole.

6. A hard disk drive comprising a thin-film magnetic head having an inductive type electromagnetic transducer, said inductive type electromagnetic transducer comprising:

a first magnetic pole;

a second magnetic pole, magnetically connected to said first magnetic pole at a position separated from a surface facing a recording medium, holding a gap layer made of a nonmagnetic material between said first and second magnetic poles;

a coil at least partly located between said first and second magnetic poles;

a recording shield layer made of a magnetic material and positioned on the side of said second magnetic pole opposite from said first magnetic pole; and a recording shield gap layer made of a nonmagnetic material and positioned between said second magnetic pole and said recording shield layer;

said recording shield layer covering, by way of said recording shield gap layer, at least both lateral parts of said second magnetic pole on the side of said second magnetic pole facing the recording medium, wherein said second magnetic pole has a stepped part with a changed height; and said recording shield layer has a step at a position corresponding to said stepped part in said second magnetic pole.

* * * * *